(12) United States Patent
Fan et al.

(10) Patent No.: US 12,093,084 B2
(45) Date of Patent: Sep. 17, 2024

(54) BLANK HOLDER ASSEMBLY, DISPLAY APPARATUS AND ELECTRONIC DEVICE

(71) Applicant: Beijing Xiaomi Mobile Software Co., Ltd., Beijing (CN)

(72) Inventors: Xizhuang Fan, Beijing (CN); Yuanyuan Hu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/823,798

(22) Filed: Aug. 31, 2022

(65) Prior Publication Data

US 2023/0341905 A1    Oct. 26, 2023

(30) Foreign Application Priority Data

Apr. 22, 2022   (CN) .......................... 202210431796.0

(51) Int. Cl.
    *G06F 1/16*    (2006.01)
(52) U.S. Cl.
    CPC .......... *G06F 1/1652* (2013.01); *G06F 1/1656* (2013.01)

(58) Field of Classification Search
CPC . G09G 2380/02; G06F 1/1652; G06F 1/1681; H05K 5/03; H05K 7/1427; H05K 2201/051; G09F 9/301
See application file for complete search history.

(56) References Cited

U.S. PATENT DOCUMENTS

| 2021/0242420 | A1* | 8/2021 | Luo ...................... H10K 77/111 |
| 2021/0366318 | A1* | 11/2021 | Feng ..................... G06F 1/1652 |
| 2022/0238626 | A1* | 7/2022 | Choi ..................... H10K 59/131 |
| 2022/0240402 | A1* | 7/2022 | Choi ..................... H05K 5/0226 |
| 2022/0317732 | A1* | 10/2022 | Lee ....................... H04M 1/021 |
| 2022/0400559 | A1* | 12/2022 | Jiang ..................... G09F 9/301 |

FOREIGN PATENT DOCUMENTS

| EP | 2960747 A2 | 12/2015 |
| WO | 2021213515 A1 | 10/2021 |

* cited by examiner

*Primary Examiner* — James Wu
*Assistant Examiner* — Dakota M Talbert
(74) *Attorney, Agent, or Firm* — McCoy Russell LLP (57) ABSTRACT

A blank holder assembly includes a supporting piece and a plurality of blank holder pieces; the plurality of blank holder pieces are sequentially arranged along an outer edge of the supporting piece, and configured to fix a flexible display panel adjoined to one surface of the supporting piece; and when the blank holder assembly is in a folded state, the plurality of blank holder pieces can be folded together with the flexible display panel.

13 Claims, 4 Drawing Sheets

BLANK HOLDER ASSEMBLY, DISPLAY APPARATUS AND ELECTRONIC DEVICE

CROSS REFERENCE TO RELATED APPLICATIONS

The present application claims priority to Chinese Patent Application No. 202210431796.0, filed on Apr. 22, 2022. The entire contents of the above-listed application are hereby incorporated by reference for all purposes.

BACKGROUND

In an electronic device, a display apparatus is often configured and used to display various information.

In the related art, there is a display apparatus including a flexible display panel. Due to the characteristics of the flexible display panel, it can be unfolded when in use and can be folded when not in use.

However, limited by the characteristics of the flexible display panel, its structural strength is poor, and it is prone to being damaged under an external force.

SUMMARY

The disclosure belongs to the technical field of electronics, and particularly relates to a blank holder assembly, a display apparatus and an electronic device.

According to one aspect of the disclosure, a blank holder assembly is provided and includes a supporting piece and a plurality of blank holder pieces.

The plurality of blank holder pieces are sequentially arranged along an outer edge of the supporting piece, and configured to fix a flexible display panel adjoined to one surface of the supporting piece.

When the blank holder assembly is in a folded state, the plurality of blank holder pieces can be folded together with the flexible display panel.

According to another aspect of the disclosure, a display apparatus is provided and includes a flexible display panel and a blank holder assembly.

The blank holder assembly comprises a supporting piece and a plurality of blank holder pieces, the plurality of blank holder pieces are sequentially arranged along an outer edge of the supporting piece, and configured to fix a flexible display panel adjoined to one surface of the supporting piece, an outer edge of the flexible display panel and an outer edge of the supporting piece are together inserted into each of the blank holder pieces, when the blank holder assembly is in a folded state, the plurality of blank holder pieces can be folded together with the flexible display panel.

According to another aspect of the disclosure, an electronic device is provided and includes a display apparatus.

The display apparatus comprises a flexible display panel and a blank holder assembly, the blank holder assembly comprises a supporting piece and a plurality of blank holder pieces, the plurality of blank holder pieces are sequentially arranged along an outer edge of the supporting piece, and configured to fix a flexible display panel adjoined to one surface of the supporting piece, an outer edge of the flexible display pane and the outer edge of the supporting piece are together inserted into each of the blank holder pieces, when the blank holder assembly is in a folded state, the plurality of blank holder pieces can be folded together with the flexible display panel.

BRIEF DESCRIPTION OF THE DRAWINGS

In order to more clearly illustrate the technical solutions in the examples of the disclosure, the following will briefly introduce the accompanying drawings needed in the description of the examples. Apparently, the accompanying drawings in the following description are merely some examples of the disclosure. For those of ordinary skill in the art, other accompanying drawings can be acquired according to these accompanying drawings without creative effort.

The meanings of signs in the figure are as follows:
10—supporting piece;
110—groove;
20—blank holder piece;
210—first mounting part; 211—first substrate board; 212—adhesive layer; 220—connecting part; 230—second mounting part; 231—second substrate board; 232—protrusion; 240—accommodating space; and
100—flexible display panel.

DETAILED DESCRIPTION

In order to make objectives, technical solutions and advantages of the disclosure clearer, the examples of the disclosure will be further described in detail below with reference to the accompanying drawings.

Unless otherwise defined, technical or scientific terms used herein should have the ordinary meaning as understood by one of ordinary skill in the art to which the disclosure belongs. The terms "first", "second", "third" and the like used in the description and claims of the disclosure do not denote any order, quantity or importance, but are merely used to distinguish different components. Likewise, "a" or "an" and the like do not denote a quantitative limitation, but rather denote that there is at least one. "Comprise" or "include" and similar words mean that the elements or objects appearing before "comprise" or "include" encompass the elements or objects recited after "comprise" or "include" and their equivalents, but do not exclude other elements or objects. Similar words such as "connect" or "link" are not limited to physical or mechanical connection, but may include electrical connection, whether direct or indirect. "Up", "down", "left", "right" and the like are merely used to indicate a relative positional relationship, and when the absolute position of the described object changes, the relative positional relationship may also change accordingly.

In an electronic device, a display apparatus is often configured and used to display various information.

In the related art, there is a display apparatus including a flexible display panel. Due to the characteristics of the flexible display panel, it can be unfolded when in use and can be folded when not in use.

However, limited by the characteristics of the flexible display panel, its structural strength is poor, and it is prone to being damaged under an external force.

Figure 1:
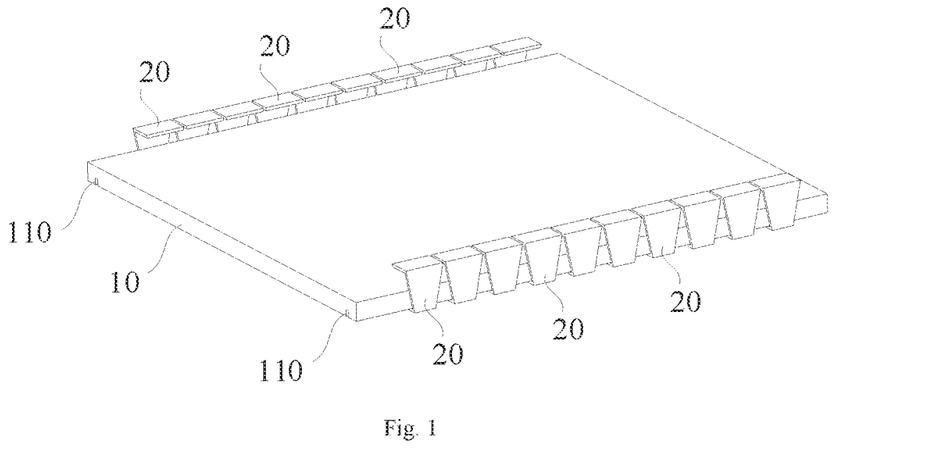
FIG. 1 is a schematic structural diagram of a blank holder assembly provided by an example of the disclosure.

In order to solve the above technical problems, an example of the disclosure provides a blank holder assembly. FIG. 1 is a schematic structural diagram of the blank holder assembly. Referring to FIG. 1, in the example, the blank holder assembly includes a supporting piece 10 and a plurality of blank holder pieces 20.

The plurality of blank holder pieces 20 are sequentially arranged along an outer edge of the supporting piece 10, and configured to fix a flexible display panel 100 adjoined to one surface of the supporting piece 10, and the flexible display panel 100 can slide relative to the supporting piece 10. When the blank holder assembly is in a folded state, the plurality of blank holder pieces 20 can be folded together with the flexible display panel 100.

Figure 2:
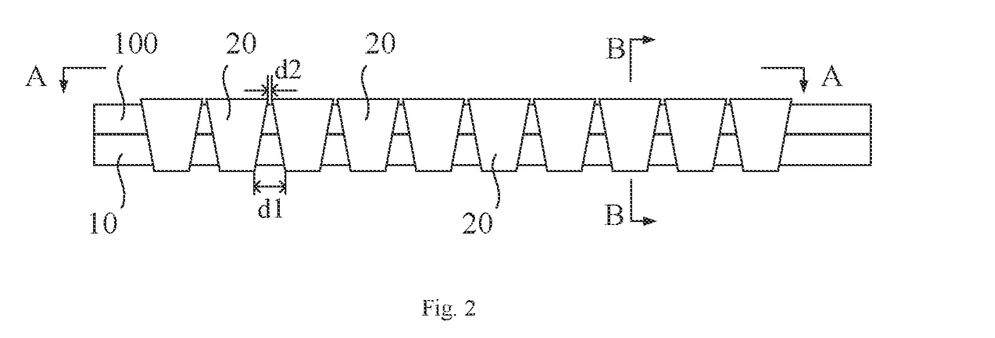
FIG. 2 is a schematic diagram of an unfolded state of a blank holder assembly provided by an example of the disclosure.
Figure 3:
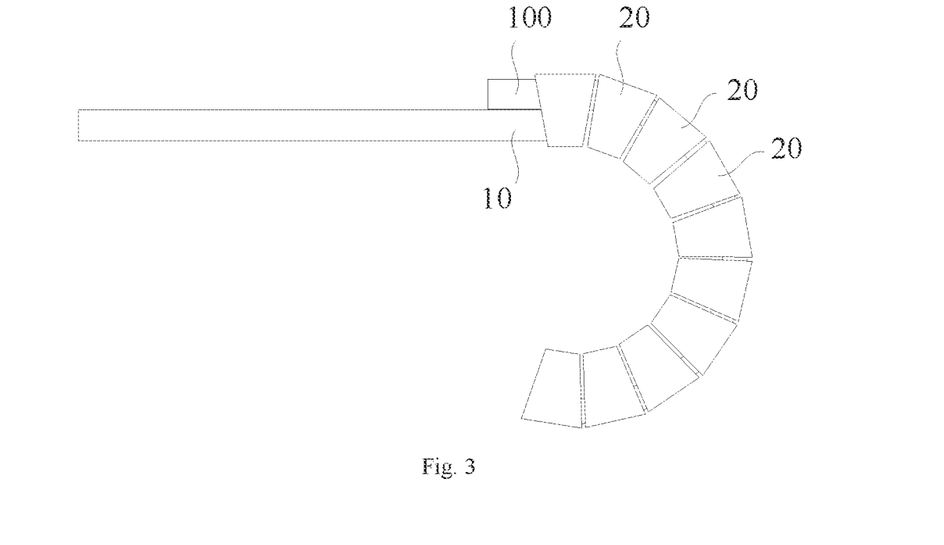
FIG. 3 is a schematic diagram of a folded state of a blank holder assembly provided by an example of the disclosure.

After the blank holder assembly provided by the example of the disclosure is configured on the display apparatus, when the flexible display panel 100 is unfolded, the blank holder assembly is in the unfolded state, referring to FIG. 2, one surface of the supporting piece 10 is adjoined to the flexible display panel 100, so that the flexible display panel 100 can be stably supported by the supporting piece 10, a structural strength of the flexible display panel 100 is effectively enhanced, and the damage to the flexible display panel 100 under the external force is avoided. Moreover, the flexible display panel 100 and the supporting piece 10 can be fixed together through the blank holder pieces 20, the separation of the flexible display panel 100 from the supporting piece 10 is avoided, and the support of the supporting piece 10 for the flexible display panel 100 is further ensured. In addition, when the flexible display panel 100 is folded, the blank holder assembly is in the folded state, referring to FIG. 3, the supporting piece 10 no longer supports a flexible display screen, and the blank holder pieces 20 can be folded together with the flexible display panel 100, so that the blank holder assembly will not affect the normal folding of the flexible display panel 100.

In other words, the blank holder assembly provided by the example of the disclosure can stably support the flexible display panel 100 when the flexible display panel is in the unfolded state, and can also be folded together with the flexible display panel 100 when the flexible display panel is in the folded state.

As can be seen from the foregoing, the blank holder pieces 20 play a key role in fixing the flexible display screen on the supporting piece 10. The blank holder pieces 20 will be introduced below.

Figure 4:
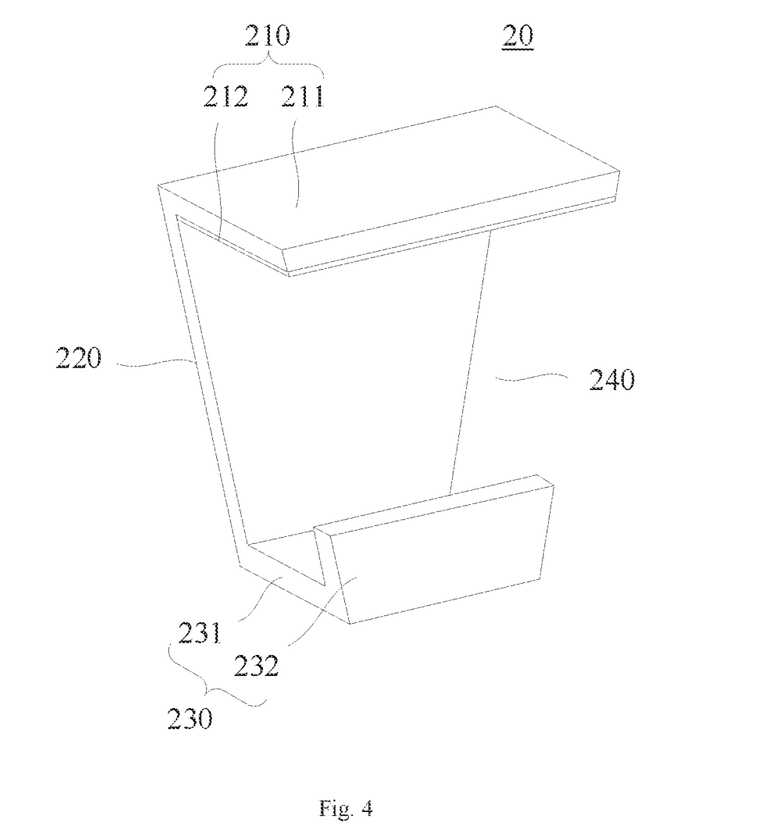
FIG. 4 is a schematic structural diagram of blank holder pieces provided by an example of the disclosure.

FIG. 4 is a schematic structural diagram of the blank holder pieces 20. Referring to FIG. 4, in the example, each blank holder piece 20 includes a first mounting part 210, a connecting part 220 and a second mounting part 230 which are sequentially connected, the first mounting part 210 is opposite to the second mounting part 230, such that an accommodating space 240 is formed among the first mounting part 210, the connecting part 220 and the second mounting part 230.

In the above examples, the first mounting part 210 is configured to mount the flexible display panel 100, the second mounting part 230 is configured to mount the supporting piece 10, the connecting part 220 is configured to connect the first mounting part 210 with the second mounting part 230, so that the flexible display panel 100 inserted into the accommodating space 240 can be adjoined to the supporting piece 10, and the flexible display panel 100 is supported by the supporting piece 10.

Figure 5:
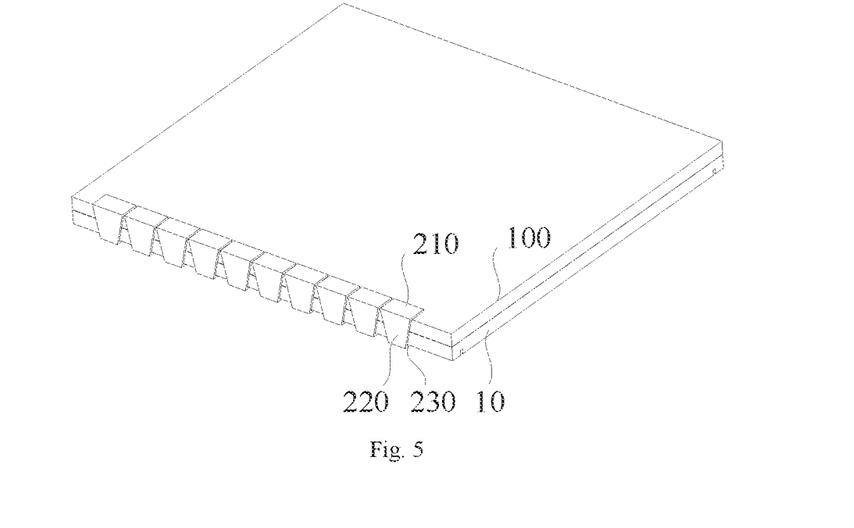
FIG. 5 is a schematic diagram of assembling of blank holder pieces provided by an example of the disclosure.

FIG. 5 is a schematic diagram of assembling of the blank holder pieces 20. Referring to FIG. 4 and FIG. 5, in the example, one side edge of the flexible display panel 100 is located in the accommodating space 240 and connected to the first mounting part 210. One side edge of the supporting piece 10 is located in the accommodating space 240 and slidably connected to the second mounting part 230.

The flexible display panel 100 is connected to the first mounting part 210, that is, the flexible display panel 100 keeps relatively stationary with the blank holder pieces 20 all the time. The supporting piece 10 is slidably connected to the second mounting part 230, that is, the supporting piece 10 can slide relative to the blank holder pieces 20. In this way, when the flexible display panel 100 is switched between the unfolded state and the folded state, the blank holder pieces 20 slide together with the flexible display panel 100. When the flexible display panel 100 is switched from the folded state to the unfolded state, the flexible display panel 100 slides relative to the supporting piece 10, and the blank holder pieces 20 slide relative to the supporting piece 10 synchronously until the flexible display panel 100 is gradually spread on the supporting piece 10, so as to complete unfolding. When the flexible display panel 100 is switched from the unfolded state to the folded state, the flexible display panel 100 slides relative to the supporting piece 10, and the blank holder pieces 20 slide relative to the supporting piece 10 synchronously until the flexible display panel 100 is gradually separated from the supporting piece 10, so as to complete folding.

It is easy to understand that the reason why the flexible display panel 100 can be folded is because of its soft characteristics. the reason why the plurality of blank holder pieces 20 can be folded together with the flexible display panel 100 is that there is a activity space between the two adjacent blank holder pieces 20, which can produce corresponding overall deformation with the folding of the flexible display panel 100 that is, the blank holder pieces 20 themselves do not produce deformation, but the overall shape combined by the plurality of blank holder pieces 20 produces deformation.

Referring to FIG. 2 again, in the example, when the blank holder assembly is in the unfolded state, a spacing between the second mounting parts 230 of the two adjacent blank holder pieces 20 is greater than a spacing between the first mounting parts 210 of the two adjacent blank holder pieces 20.

In the above examples, since the spacing d1 between the two adjacent second mounting parts 230 is greater than the spacing d2 between the two adjacent first mounting parts 210, an activity space is formed between the two adjacent second mounting parts 230, so that the plurality of blank holder pieces 20 can be deformed as a whole. For example, when the blank holder assembly is in the unfolded state, the spacing d1 between the two adjacent second mounting parts 230 is greater than the spacing d2 between the two adjacent first mounting parts 210, when the blank holder assembly is in the folded state, the spacing d1 between the two adjacent second mounting parts 230 is significantly reduced, while the spacing d2 between the two adjacent first mounting parts 210 remains unchanged or changes slightly. After the plurality of blank holder pieces 20 are folded, in the same blank holder piece 20, the second mounting part 230 is closer to a center of a circle of the flexible display screen than the first mounting part 210.

Figure 6:
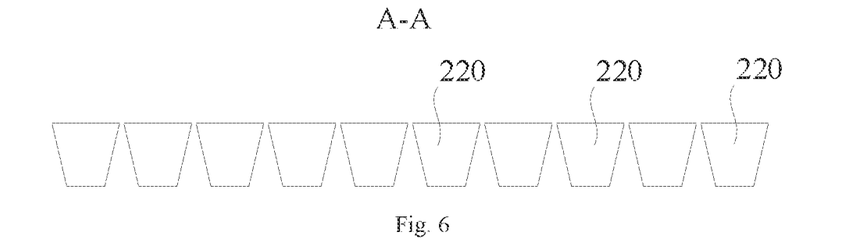
FIG. 6 is a sectional view in a direction A-A of FIG. 2 provided by an example of the disclosure.

FIG. 6 is a sectional view in a direction A-A of FIG. 2. Referring to FIG. 6, in the example, in a direction from the first mounting part 210 to the second mounting part 230, a longitudinal section of the connecting part 220 is a trapezoid.

One side edge, connected to the first mounting part 210, of the connecting part 220 is a lower bottom of the trapezoid, one side edge, connected to the second mounting part 230, of the connecting part 220 is an upper bottom of the trapezoid. The orthographic projections of the first mounting part 210 and the second mounting part 230 on a plane where the connecting part 220 is located are both located in the connecting part 220, to make the angle between the first mounting part 210 and the connecting part 220, and the angle between the second mounting part 230 and the connecting part 220 are at right angle or acute angle, so as to facilitate clamping the supporting piece 10 and the flexible display panel 100.

In the above examples, since the upper bottom of the trapezoid is shorter than the lower bottom, the spacing d1 between the two adjacent second mounting parts 230 is greater than the spacing d2 between the two adjacent first mounting parts 210. When the blank holder assembly is in the folded state, nonparallel sides of the two adjacent trapezoids are adjoined to each other.

For example, the trapezoid is an isosceles trapezoid. Such a design can provide a sufficient activity space between the two blank holder pieces 20, and ensure that the overall deformation amplitude of the plurality of blank holder pieces 20 is relatively large, so as to adapt to the folding of the flexible display panel 100.

The folding mode of the blank holder pieces 20 is introduced above, and the following continues to introduce a mounting mode among the blank holder pieces 20, the flexible display panel 100 and the supporting piece 10.

Figure 7:
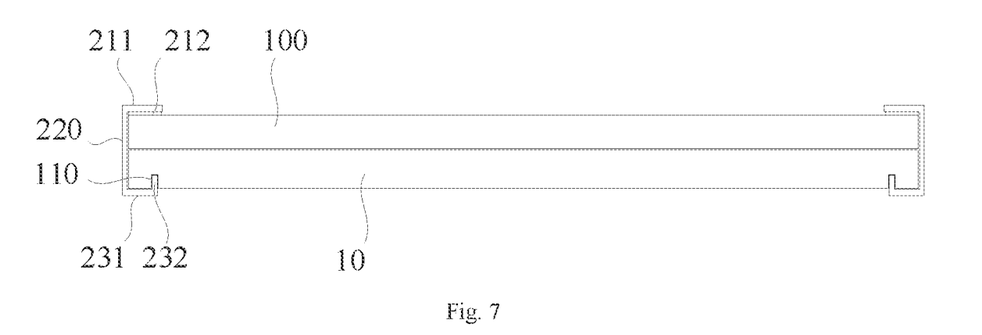
FIG. 7 is a sectional view in a direction B-B of FIG. 2 provided by an example of the disclosure.

FIG. 7 is a sectional view of a direction B-B of FIG. 2. Referring to FIG. 7, in the example, the first mounting part 210 includes a first substrate board 211 and an adhesive layer 212, the first substrate board 211 is connected to the connecting part 220, and the adhesive layer 212 is located on one surface, facing the second mounting part 230, of the first substrate 211.

In the above examples, the first substrate board 211 is a main body of the first mounting part 210, and configured to provide a stable connecting basis for the flexible display panel 100. The adhesive layer 212 is configured to adhere the flexible display panel 100 to the first substrate 211, so as to realize the connection between the first mounting part 210 and the flexible display panel 100.

Moreover, since the first substrate board 211 is a plate-shaped structural piece, it can be better adjoined to the flexible display panel 100, so that a contact area between the first mounting part 210 and the flexible display panel 100 is enough, and the connection firmness between the first mounting part 210 and the flexible display panel 100 is improved.

For example, the first substrate board 211 is a rectangular plate, and in other examples, the first substrate board 211 may further be plates of other shapes, such as triangles, diamonds and the like, which are not limited in the disclosure.

For example, the adhesive layer 212 is an adhesive smeared on the first substrate 211, or a double-sided adhesive pasted on the first substrate 211, which is not limited by the disclosure.

Continuing to refer to FIG. 7, in the example, the second mounting part 230 includes a second substrate board 231 and a protrusion 232. The second substrate board 231 is connected to the connecting part 220, the protrusion 232 is connected to the second substrate board 231, and the protrusion 232 is away from the connecting part 220.

One surface, facing the second mounting part 230, of the supporting piece 10 has a groove 110, the groove 110 extends in an arrangement direction of the plurality of blank holder pieces 20, and the protrusion 232 is slidably inserted into the groove 110.

In the above examples, the second substrate board 231 is a main body of the second mounting part 230, and configured to provide a stable supporting basis for the supporting piece 10. The protrusion 232 is inserted into the groove 110, so that the supporting piece 10 can be stably clamped into the blank holder pieces 20 by the protrusion 232, the second substrate board 231 and the connecting part 220 together.

Moreover, since the second substrate board 231 is a plate-shaped structural piece, it can be better adjoined to the supporting piece 10, so that a contact area between the second mounting part 230 and the supporting piece 10 is ensured, and the supporting firmness of the second mounting part 230 for the supporting piece 10 is improved.

For example, the second substrate board 231 is a rectangular plate, and in other examples, the second substrate board 231 may further be plates of other shapes, such as triangles, diamonds and the like, which is not limited in the disclosure.

In the example, the supporting piece 10 is a plate-shaped structural piece. In this way, one plate surface of the supporting piece 10 is adjoined to the flexible display panel 100, so that a contact area between the supporting piece 10 and the flexible display panel 100 can be enough, and the flexible display panel 100 is better supported. The other plate surface of the supporting piece 10 is adjoined to the second substrate board 231, so that a contact area between the supporting piece 10 and the second substrate board 231 can be enough, so as to better obtain the support of the second substrate board 231.

For example, one end, facing away from the second substrate board 231, of the protrusion 232 is in an arc shape, and the end, facing away from the second substrate board 231, of the protrusion 232 is in sliding contact with a bottom of the groove 110.

In the above examples, the end, facing away from the second substrate board 231, of the protrusion 232 is in an arc shape, which can effectively reduce a friction between the protrusion 232 and the supporting piece 10, so that the supporting piece 10 can slide smoothly relative to the second mounting part 230, facilitating the switching between the unfolded state and the folded state of the blank holder assembly.

Figure 8:
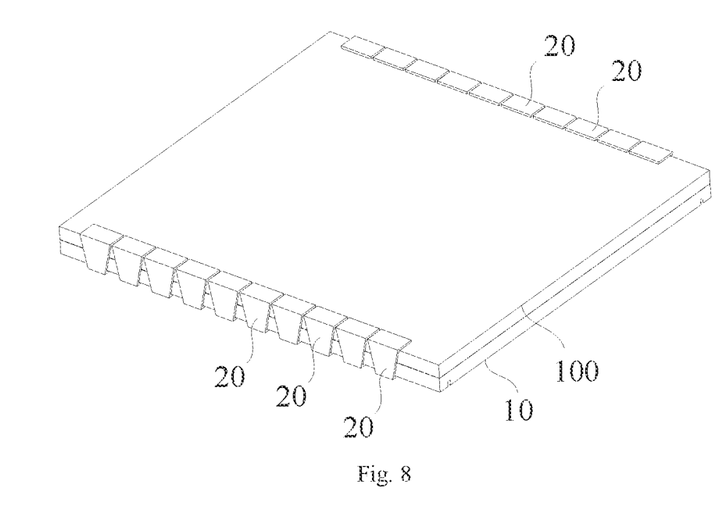
FIG. 8 is a schematic structural diagram of a display apparatus provided by an example of the disclosure.

FIG. 8 is a schematic structural diagram of a display apparatus provided by an example of the disclosure. Referring to FIG. 8, in the example, the display apparatus includes a flexible display panel 100 and the blank holder assembly shown in FIGS. 1-7.

The flexible display panel 100 is adjoined to the supporting piece 10, and an outer edge of the flexible display panel 100 and an outer edge of the supporting piece 10 are together inserted into each of the blank holder pieces 20.

When the flexible display panel 100 is unfolded, the blank holder assembly is in the unfolded state, referring to FIG. 2, one surface of the supporting piece 10 is adjoined to the flexible display panel 100, so that the flexible display panel 100 can be stably supported by the supporting piece 10, a structural strength of the flexible display panel 100 is effectively enhanced, and the damage to the flexible display panel 100 under the external force is avoided. Moreover, the flexible display panel 100 and the supporting piece 10 can be fixed together through the blank holder pieces 20, the separation of the flexible display panel 100 from the supporting piece 10 is avoided, and the support of the supporting piece 10 for the flexible display panel 100 is further ensured. In addition, when the flexible display panel 100 is folded, the blank holder assembly is in the folded state, referring to FIG. 3, the supporting piece 10 no longer supports a flexible display screen, and the blank holder pieces 20 can be folded together with the flexible display panel 100, so that the blank holder assembly will not affect the normal folding of the flexible display panel 100.

In other words, the display apparatus provided by the example of the disclosure can have a stable structural strength in the unfolded state, and can also be folded normally.

In the example, the outer edge of the flexible display panel 100 and the outer edge of the supporting piece 10 are together inserted into parts of each the blank holder piece 20, and the other opposite outer edge of the flexible display panel 100 and the other opposite outer edge of the supporting piece 10 are together inserted into the other parts of each blank holder piece 20.

In the above examples, the flexible display panel 100 is supported by the supporting piece 10 as a whole, and the two outer edges of the flexible display panel 100 are reinforced by the blank holder pieces 20. In this way, the structural strength of the flexible display panel 100 can be better enhanced through the blank holder assembly, and reliability of the display apparatus is further improved.

In the example, an outer edge, located in the accommodating space 240, of the flexible display panel 100 is flush with an outer edge, located in the accommodating space 240, of the supporting piece 10. With such a design, it is convenient for the blank holder pieces 20 to adjoin the flexible display panel 100 to the supporting piece 10.

Figure 9:
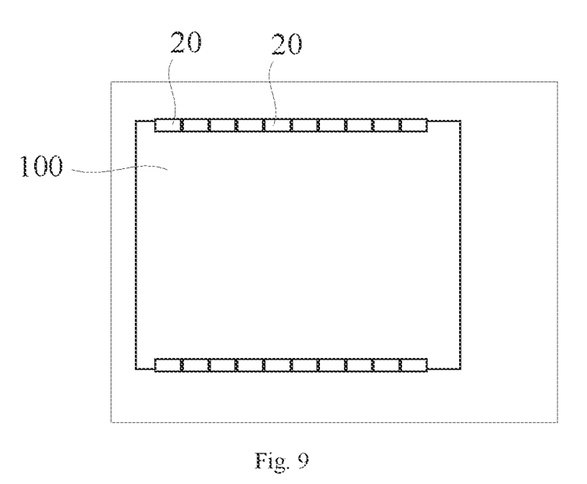
FIG. 9 is a schematic structural diagram of an electronic device provided by an example of the disclosure.

FIG. 9 is a schematic structural diagram of an electronic device provided by an example of the disclosure. Referring to FIG. 9, in the example, the electronic device includes the display apparatus.

Since the electronic device includes the display apparatus shown in FIG. 8, the electronic device has all the beneficial effects of the display apparatus shown in FIG. 8, which will not be repeated here.

In the example, the electronic device is a mobile phone, a tablet computer and the like, which is not limited in the disclosure.

If the electronic device is the mobile phone, the mobile phone is a scroll-screen mobile phone. When the mobile phone is in the folded state, the display apparatus is in the folded state accordingly. At this moment, a size of the mobile phone is small, which can be easy to hold. When the mobile phone is in the unfolded state, the display apparatus is in the unfolded state accordingly. At this moment, a screen of the mobile phone is large, which can be easy to watch and click.

The above are merely optional examples of the disclosure and are not intended to limit the disclosure. Any modifications, equivalent replacements, improvements and the like made within the spirit and principles of the disclosure should fall within the protection scope of the disclosure.

Embodiments

A first embodiment includes a blank holder assembly, including a supporting piece (10) and a plurality of blank holder pieces, the plurality of blank holder pieces are sequentially arranged along an outer edge of the supporting piece, and configured to fix a flexible display panel adjoined to one surface of the supporting piece, and when the blank holder assembly is in a folded state, the plurality of blank holder pieces can be folded together with the flexible display panel.

A second embodiment includes the blank holder assembly of embodiment 1, the blank holder piece comprises a first mounting part, a connecting part and a second mounting part which are sequentially connected, the first mounting part is opposite to the second mounting part, to make an accommodating space that is formed among the first mounting part, the connecting part and the second mounting part, one side edge of the flexible display panel is located in the accommodating space and connected to the first mounting part, and one side edge of the supporting piece is located in the accommodating space and slidably connected to the second mounting part.

A third embodiment includes the blank holder assembly of embodiment 1, when the blank holder assembly is in an unfolded state, a spacing between the second mounting parts of two adjacent blank holder pieces is greater than a spacing between the first mounting parts of the two adjacent blank holder pieces.

A fourth embodiment includes the blank holder assembly of embodiment 3, in a direction from the first mounting part to the second mounting part, a longitudinal section of the connecting part is a trapezoid, one side edge, connected to the first mounting part, of the connecting part is a lower bottom of the trapezoid, and one side edge, connected to the second mounting part, of the connecting part is an upper bottom of the trapezoid, and orthographic projections of the first mounting par and the second mounting part on a plane where the connecting part is located are both located in the connecting part.

A fifth embodiment includes the blank holder assembly of embodiment 4, he trapezoid is an isosceles trapezoid.

A sixth embodiment includes the blank holder assembly of embodiment 2, the first mounting part comprises a first substrate board and an adhesive layer, the first substrate board is connected to the connecting part, and the adhesive layer is located on one surface, facing the second mounting part, of the first substrate board.

A seventh embodiment includes the blank holder assembly of embodiment 2, the second mounting part comprises a second substrate board and a protrusion, the second substrate board is connected to the connecting part, the protrusion is connected to the second substrate board and away from the connecting part, and one surface, facing the second mounting part, of the supporting piece has a groove, the groove extends in an arrangement direction of the plurality of blank holder pieces, and the protrusion is slidably inserted into the groove.

An eighth embodiment includes he blank holder assembly of embodiment 7, one end, facing away from the second substrate board, of the protrusion is in an arc shape, and the end, facing away from the second substrate board, of the protrusion is in sliding contact with a bottom of the groove.

A ninth embodiment includes a display apparatus, including a flexible display panel and the blank holder assembly according to any one of embodiment 1 to 8.

A tenth embodiment includes the display apparatus of embodiment 16, the outer edge of the flexible display panel and the outer edge of the supporting piece are together inserted into parts of the blank holder pieces, and the other opposite outer edge of the flexible display panel and the other opposite outer edge of the supporting piece are together inserted into the other parts of the blank holder pieces.

An eleventh embodiment includes an electronic device, including a display apparatus according to embodiment 9 or 10.

The invention claimed is:

1. A blank holder assembly, comprising a supporting piece and a plurality of blank holder pieces, wherein
the plurality of blank holder pieces are sequentially arranged along an outer edge of the supporting piece, and configured to fix a flexible display panel adjoined to one surface of the supporting piece, wherein the flexible display panel is slidable relative to the supporting piece,
when the blank holder assembly is in a folded state, the plurality of blank holder pieces can be folded together with the flexible display panel,
wherein each blank holder piece comprises a first mounting part, a connecting part and a second mounting part which are sequentially connected,
the first mounting part is opposite to the second mounting part, to make an accommodating space that is formed among the first mounting part, the connecting part and the second mounting part,
wherein the first mounting part comprises a first substrate board and an adhesive layer,
the adhesive layer is located on one surface, facing the second mounting part, of the first substrate board, and the adhesive layer is configured to adhere the flexible display panel to the first substrate,
wherein the second mounting part comprises a second substrate board and a protrusion,
the second substrate board is connected to the connecting part, and
one side edge of the supporting piece is located in the accommodating space, and one surface, facing the second mounting part, of the supporting piece has a groove, the groove extends in an arrangement direction of the plurality of blank holder pieces, and the protrusion is slidably inserted into the groove.

2. The blank holder assembly according to claim 1, wherein when the blank holder assembly is in an unfolded state, a spacing between the second mounting parts of two adjacent blank holder pieces is greater than a spacing between the first mounting parts of the two adjacent blank holder pieces.

3. The blank holder assembly according to claim 2, wherein in a direction from the first mounting part to the second mounting part, a longitudinal section of the connecting part is a trapezoid,
one side edge, connected to the first mounting part, of the connecting part is a lower bottom of the trapezoid, and one side edge, connected to the second mounting part, of the connecting part is an upper bottom of the trapezoid, and
orthographic projections of the first mounting part and the second mounting part on a plane where the connecting part is located are both located in the connecting part.

4. The blank holder assembly according to claim 3, wherein the trapezoid is an isosceles trapezoid.

5. The blank holder assembly according to claim 1, wherein one end, facing away from the second substrate board, of the protrusion is in an arc shape, and the end, facing away from the second substrate board, of the protrusion is in sliding contact with a bottom of the groove.

6. A display apparatus, comprising a flexible display panel and a blank holder assembly, wherein
the blank holder assembly comprises a supporting piece and a plurality of blank holder pieces, wherein
the plurality of blank holder pieces are sequentially arranged along an outer edge of the supporting piece, and configured to fix a flexible display panel adjoined to one surface of the supporting piece, wherein the flexible display panel is slidable relative to the supporting piece, an outer edge of the flexible display panel and an outer edge of the supporting piece are together inserted into each of the blank holder pieces,
when the blank holder assembly is in a folded state, the plurality of blank holder pieces can be folded together with the flexible display panel,
wherein each blank holder piece comprises a first mounting part, a connecting part and a second mounting part which are sequentially connected,
the first mounting part is opposite to the second mounting part, to make an accommodating space that is formed among the first mounting part, the connecting part and the second mounting part,
wherein the first mounting part comprises a first substrate board and an adhesive layer,
the adhesive layer is located on one surface, facing the second mounting part, of the first substrate board, and the adhesive layer is configured to adhere the flexible display panel to the first substrate,
wherein the second mounting part comprises a second substrate board and a protrusion,
the second substrate board is connected to the connecting part, and
one side edge of the supporting piece is located in the accommodating space, and one surface, facing the second mounting part, of the supporting piece has a groove, the groove extends in an arrangement direction of the plurality of blank holder pieces, and the protrusion is slidably inserted into the groove.

7. The display apparatus according to claim 6, wherein the outer edge of the flexible display panel and the outer edge of the supporting piece are together inserted into parts of each blank holder piece and the other opposite outer edge of the flexible display panel and the other opposite outer edge of the supporting piece are together inserted into the other parts of each blank holder piece.

8. The display apparatus according to claim 6, wherein when the blank holder assembly is in an unfolded state, a spacing between the second mounting parts of two adjacent blank holder pieces is greater than a spacing between the first mounting parts of the two adjacent blank holder pieces.

9. The display apparatus according to claim 8, wherein in a direction from the first mounting part to the second mounting part, a longitudinal section of the connecting part is a trapezoid,
one side edge, connected to the first mounting part, of the connecting part is a lower bottom of the trapezoid, and one side edge, connected to the second mounting part, of the connecting part is an upper bottom of the trapezoid, and orthographic projections of the first mounting part and the second mounting part on a plane where the connecting part is located are both located in the connecting part.

10. The display apparatus according to claim 9, wherein the trapezoid is an isosceles trapezoid.

11. The display apparatus according to claim 6, wherein one end, facing away from the second substrate board, of the protrusion is in an arc shape, and the end, facing away from the second substrate board, of the protrusion is in sliding contact with a bottom of the groove.

12. An electronic device, comprising a display apparatus, wherein the display apparatus comprises a flexible display panel and a blank holder assembly, wherein the blank holder assembly comprises a supporting piece and a plurality of blank holder pieces, wherein the plurality of blank holder pieces are sequentially arranged along an outer edge of the supporting piece, and configured to fix a flexible display panel adjoined to one surface of the supporting piece, wherein the flexible display panel is slidable relative to the supporting piece, an outer edge of the flexible display panel and the outer edge of the supporting piece are together inserted into each of the blank holder pieces, when the blank holder assembly is in a folded state, the plurality of blank holder pieces can be folded together with the flexible display panel, wherein each blank holder piece comprises a first mounting part, a connecting part and a second mounting part which are sequentially connected, the first mounting part is opposite to the second mounting part, to make an accommodating space that is formed among the first mounting part, the connecting part and the second mounting part, wherein the first mounting part comprises a first substrate board and an adhesive layer, the adhesive layer is located on one surface, facing the second mounting part, of the first substrate board, and the adhesive layer is configured to adhere the flexible display panel to the first substrate, wherein the second mounting part comprises a second substrate board and a protrusion, the second substrate board is connected to the connecting part, and one side edge of the supporting piece is located in the accommodating space, and one surface, facing the second mounting part, of the supporting piece has a groove, the groove extends in an arrangement direction of the plurality of blank holder pieces, and the protrusion is slidably inserted into the groove.

13. The electronic device according to claim 12, wherein when the blank holder assembly is in an unfolded state, a spacing between the second mounting parts of two adjacent blank holder pieces is greater than a spacing between the first mounting parts of the two adjacent blank holder pieces.

* * * * *